(12) United States Patent
Jin et al.

(10) Patent No.: US 12,263,444 B2
(45) Date of Patent: Apr. 1, 2025

(54) SOLVENT-RESISTANT POLYMERIC NANOFILTRATION MEMBRANE, PREPARATION METHOD AND USE THEREOF

(71) Applicant: SOOCHOW UNIVERSITY, Suzhou (CN)

(72) Inventors: Jian Jin, Suzhou (CN); Zhenggong Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 464 days.

(21) Appl. No.: 17/794,224

(22) PCT Filed: Sep. 22, 2020

(86) PCT No.: PCT/CN2020/116667
§ 371 (c)(1),
(2) Date: Jul. 20, 2022

(87) PCT Pub. No.: WO2021/227330
PCT Pub. Date: Nov. 18, 2021

(65) Prior Publication Data
US 2023/0100275 A1    Mar. 30, 2023

(30) Foreign Application Priority Data

May 11, 2020 (CN) .......................... 202010392887.9

(51) Int. Cl.
*B01D 69/02*    (2006.01)
*B01D 61/02*    (2006.01)
(Continued)

(52) U.S. Cl.
CPC ....... *B01D 61/027* (2013.01); *B01D 67/0006* (2013.01); *B01D 69/02* (2013.01);
(Continued)

(58) Field of Classification Search
None
See application file for complete search history.

(56) References Cited

FOREIGN PATENT DOCUMENTS

| CN | 103025796 A | 4/2013 |
|---|---|---|
| CN | 107261870 A | 10/2017 |

(Continued)

OTHER PUBLICATIONS

Lina Nie et al., "Realizing small-flake graphene oxide membranes for ultrafast size-dependent organic solvent nanofiltration" Sci. Adv. 2020; 6: No. 17, pp. 1-12 (Apr. 24, 2020).

(Continued)

*Primary Examiner* — Chester T Barry
(74) *Attorney, Agent, or Firm* — SZDC Law PC (57) ABSTRACT

The invention a solvent-resistant polymeric nanofiltration membrane and preparation method thereof. The method includes subjecting a diamine monomer and a dianhydride monomer to cyclization imidization in a first polar organic solvent at 160 to 230° C., to form a polyimide, wherein the diamine monomer includes a diamine monomer with a carboxyl group and a diamine monomer without a carboxyl group; dissolving the polyimide in a second polar organic solvent, to form a membrane-forming solution; performing phase inversion to obtain an intermediate membrane; treating the intermediate membrane with an organic solution of a metal salt, so that the metal ion is coordinated and cross-linked with the carboxyl group in the polyimide, to obtain a solvent-resistant polymeric nanofiltration membrane, wherein the metal salt is a divalent and/or a multi-valent metal salt. The invention also discloses use of the solvent-resistant polymeric nanofiltration membrane in the separation and/or purification of a compound.

10 Claims, 4 Drawing Sheets

(51) Int. Cl.
*B01D 67/00* (2006.01)
*B01D 71/64* (2006.01)

(52) U.S. Cl.
CPC ...... *B01D 71/64* (2013.01); *B01D 2323/2181* (2022.08); *B01D 2325/30* (2013.01)

(56) References Cited

FOREIGN PATENT DOCUMENTS

| | | | |
|---|---|---|---|
| CN | 109880126 A | | 6/2019 |
| CN | 110801736 A | * | 2/2020 |
| CN | 111514768 A | | 8/2020 |
| EP | 0753336 A2 | * | 1/1997 |
| JP | 2019018178 A | | 2/2019 |
| WO | 03053548 A1 | | 7/2003 |
| WO | 2014123091 A1 | | 8/2014 |

OTHER PUBLICATIONS

Jamaliah H. Aburabie et al., "Alginate-based membranes: Paving the way for green organic solvent nanofiltration" Journal of Membrane Science 596 (2020) 117615 (Oct. 26, 2019).

* cited by examiner

SOLVENT-RESISTANT POLYMERIC NANOFILTRATION MEMBRANE, PREPARATION METHOD AND USE THEREOF

This application is the National Stage Application of PCT/CN2020/116667, filed on Sep. 22, 2020, which claims priority to Chinese Patent Application No. 202010392887.9, filed on May 11, 2020, which is incorporated by reference for all purposes as if fully set forth herein.

FIELD OF THE INVENTION

The present invention relates to the technical field of membrane separation, and more particularly to a solvent-resistant polymeric nanofiltration membrane and a preparation method and use thereof.

DESCRIPTION OF THE RELATED ART

Organic solvent nanofiltration (OSN) is a new type of nanofiltration membrane separation technology that has developed rapidly in recent years. Driven by the transmembrane pressure of 5-30 bar, OSN can separate and purify solute molecules with a molecular weight of 200-1000 Da in organic solvents through the sieving effect of nanofiltration membrane pores. The OSN technology has important and extensive applications in homologue separation, drug purification, dye separation, solvent recovery, etc., and is of special significance to petrochemical, pharmaceutical, food, textile and other fields. However, common nanofiltration membranes are mainly used for aqueous solution systems, and the used membrane materials have poor resistance to organic solvents, and are not suitable for organic solvent systems, especially strong polar solvent systems. Therefore, the development of solvent-resistant nanofiltration (SRNF) membranes is the key and core in the development of the OSN technology.

Nanofiltration membranes suitable for organic solvent systems need to have the characteristics of swelling resistance, corrosion resistance and high flux. Therefore, there are special requirements for the selection of membrane materials and preparation methods of solvent-resistant nanofiltration membranes. Polyimides, as a kind of polymer material with good membrane-forming properties, high thermal stability, oxidation resistance and good mechanical properties, is widely used and also has good application prospects in the preparation of solvent-resistant nanofiltration membranes. However, in highly polar organic solvents, polyimides show poor swelling resistance and ordinary chlorine resistance.

In order to solve the above-mentioned problems, the prior art has adopted a variety of methods to cross-link polyimide membranes to improve the swelling resistance and physical and chemical stability of the solvent-resistant nanofiltration membranes. For example, CN 110801736 A discloses a method for preparing a nanofiltration membrane containing a metal organic framework compound intermediate layer, in which a HKUST-1 intermediate layer is prepared on the surface of a porous polyimide base membrane containing a large amount of amino groups by in-situ growth method, and a separation layer is prepared on the intermediate layer by interfacial polymerization method. Then a nanofiltration membrane that has both excellent separation performance and good solvent resistance is obtained and not easy to peel off. CN 106459590A discloses a porous membrane containing a metal organic framework material, which includes at least one porous metal organic framework material, at least one at least bidentate organic compound coordinated with at least one metal ion, at least one fibrillated fluoropolymer, and additives. CN104689727A discloses a semi-permeable membrane, a forward osmosis and reverse osmosis water treatment device and preparation methods thereof, where the semi-permeable membrane includes a first surface, a support layer, and an active layer, where the support layer includes a porous structure having a polymer and at least one metal oxide or metalloid oxide therein.

However, the currently used cross-linking methods tend to make the polyimide molecular chains dense, which leads to a significant reduction in membrane flux and severely affects the separation efficiency of nanofiltration membranes. Therefore, there is an urgent need for a preparation method that can improve the swelling resistance and physical and chemical stability of solvent-resistant polymeric nanofiltration membranes without affecting the membrane flux.

SUMMARY OF THE INVENTION

In order to solve the existing problem of reduced membrane flux after cross-linking of nanofiltration membranes, an objective of the present invention is to provide a solvent-resistant polymeric nanofiltration membrane and a preparation method and use thereof. The polymeric nanofiltration membrane of the present invention has good solvent resistance, swelling resistance and high membrane flux in a variety of polar organic solvents.

In order to achieve the foregoing objective, the present invention adopts the following technical solution:

In one aspect, the present invention discloses a method for preparing a solvent-resistant polymeric nanofiltration membrane, including the following steps:

(1) subjecting a diamine monomer and a dianhydride monomer to cyclization imidization under the action of a catalyst in a first polar organic solvent at 160 to 230° C., to form a polyimide after the reaction is completed; where the diamine monomer includes at least one diamine monomer with a carboxyl group and at least one diamine monomer without a carboxyl group; the structural formula of the polyimide includes a first repeating unit and a second repeating unit, the first repeating unit includes at least one polymeric segment of the dianhydride monomer and the diamine monomer with a carboxyl group, the second repeating unit includes at least one polymeric segment of the dianhydride monomer and the diamine monomer without a carboxyl group;

the boiling point of the first polar organic solvent is higher than 160° C.;

(2) dissolving the polyimide in a second polar organic solvent, to form a membrane-forming solution with a concentration of 10 wt % to 40 wt %; then, performing phase inversion after the membrane-forming solution is formed into a membrane, to obtain an intermediate membrane; and (3) treating the intermediate membrane with an organic solution of a metal salt, so that the metal ion is coordinated and cross-linked with the carboxyl group in the polyimide, to obtain the solvent-resistant polymeric nanofiltration membrane after the cross-linking is completed, where the metal salt is selected from one or more divalent metal salts and/or polyvalent metal salts.

Preferably, in step (1), the diamine monomer with a carboxyl group is selected from at least one monomer with a structural formula of NH₂—R″—NH₂, in which R″ in each monomer is selected from the following structural formulas:

In the above structural formulas, the connections of "—" on the groups represent the connection sites of amine groups in the diamine monomer.

In the present invention, the carboxyl group in the diamine monomer with a carboxyl group forms a metal coordination bond with the subsequent metal ion to realize the non-covalent cross-linking of multiple polyimide segments, thereby improving the solvent resistance and compaction resistance of the polymeric nanofiltration membrane.

Preferably, in step (1), the diamine monomer without a carboxyl group is selected from at least one monomer with a structural formula of NH₂—R′—NH₂, in which R′ in each monomer is selected from the following structural formulas:

In the above structural formulas, the connections of "—" on the groups represent the connection sites of amine groups in the diamine monomer.

In the present invention, the diamine monomer without a carboxyl group functions to adjust the content of carboxyl groups in the polyimide and increase the molecular weight of the polymer to a certain extent, ensuring that the polymeric nanofiltration membrane has good membrane-forming properties and mechanical properties.

Preferably, in step (1), the dianhydride monomer is selected from at least one monomer with a structural formula of in which R in each monomer is selected from the following structural formulas:

In the above structural formulas, the connections of "—" on the groups represent the connection sites of carbonyl groups in the dianhydride monomer.

Preferably, the dianhydride monomer is an aromatic acid dianhydride monomer, and R in the dianhydride monomer is preferably one of the following structural formulas:

Preferably, in step (1), the molar ratio of the dianhydride monomer, the diamine monomer with a carboxyl group and the diamine monomer without a carboxyl group is 10:0.1-9.9:0.1-9.9, preferably 10:0.1:9.9, 10:1:9, 10:2:8, 10:3:7, 10:4:6, 10:5:5, 10:6:4, 10:7:3, 10:8:2, 10:9:1, or 10:9.9:0.1.

In the present invention, by controlling the molar ratio of the diamine monomer with a carboxyl group to the diamine monomer without a carboxyl group, it can ensure that the membrane-forming solution has good membrane-forming properties and mechanical properties, while ensuring that the density of the coordination cross-linking points in the polyimide is within an appropriate range, so as to prevent the reduced flux of the final nanofiltration membrane due to excessive coordination cross-linking points.

Preferably, in step (1), the catalyst includes triethylamine, quinoline, pyrazine and the like.

Preferably, in step (1), the first polar organic solvent includes one or more of m-cresol and/or N-methylpyrrolidone.

Preferably, in step (1), the diamine monomer is dissolved in the first polar organic solvent and then the dianhydride monomer is added in portions; a reaction system with a total solid content of 100-500 g/L is formed after uniform mixing, and then the reaction proceeds at 160-230° C. for 5-10 h.

Preferably, in step (1), during the reaction process, water generated by the reaction is removed by dehydration through an azeotropic process with toluene, to promote the progress of the reaction.

Further, in step (2), the second polar organic solvent includes one or more of m-cresol, N,N-dimethylformamide, N,N-dimethylacetamide, N-methylpyrrolidone and 1,4-dioxane. Since the polyimide of the present invention contains a large amount of carboxyl groups, it is difficult to dissolve in common solvents. The selection of above-mentioned second polar organic solvent can ensure that the polyimide synthesized in step (1) is fully dissolved.

Preferably, in step (2), a method of preparing a flat membrane or a method of preparing a hollow fiber membrane is used to form the membrane-forming solution into a membrane.

Preferably, the method of preparing a flat membrane includes the following steps:
a membrane-forming solution is coated on the surface of a substrate to form a uniform and bubble-free membrane, and then the substrate with the membrane is transferred to a phase inversion bath for phase inversion, and an intermediate membrane is obtained after the phase inversion is completed. Preferably, the coating is performed by a casting method, and the thickness of the membrane on the surface of the substrate is 50-500 μm. Preferably, the coating is performed at a humidity of 10-80%.

Preferably, the method of preparing a hollow fiber membrane includes the following steps:
(S1) a membrane-forming solution is filtered through a screen, transferred to a membrane-forming solution tank, and degassed at 15-50° C.; and
(S2) the degassed solution is subjected to solution spinning treatment to form a hollow fiber membrane.

Preferably, in step (S2), the solution spinning treatment means that a core liquid fluid is extruded through a central hole of a concentric hole spinneret, and a degassed filtrate is extruded through an annular gap of the concentric hole spinneret.

Preferably, the core liquid fluid includes one or more of water, ethanol, N,N-dimethylformamide, N,N-dimethylacetamide, and N-methylpyrrolidone.

Preferably, the phase inversion bath used in the membrane-forming process includes water and/or ethanol.

Preferably, in step (3), the divalent metal salt includes one or more of a copper salt, a nickel salt, a zinc salt, a cobalt salt, a magnesium salt, and a calcium salt, and the multi-valent metal salt includes an iron salt, a lanthanum salt and/or an aluminum salt. Preferably, the metal salt includes a copper salt or a lanthanum salt.

More preferably, the metal salt includes one or more of copper sulfate, copper nitrate, copper chloride, iron nitrate, iron chloride, nickel nitrate, nickel chloride, zinc nitrate, zinc chloride, cobalt chloride, cobalt nitrate, magnesium chloride, magnesium nitrate, aluminum chloride, aluminum nitrate, calcium nitrate, lanthanum chloride, and calcium chloride.

Preferably, in step (3), the concentration of the organic solution of the metal salt is 0.01-1 mol/L.

Preferably, in step (3), an organic solvent used in the organic solution of the metal salt includes an alcohol solvent, preferably methanol, ethanol, isopropanol, acetone, and the like. The organic solvent used in the organic solution of the metal salt will affect the degree of cross-linking of the final nanofiltration membrane and the integrity of the membrane structure. The use of alcoholic organic solvents can ensure that the degree of cross-linking of the nanofiltration membrane is within an appropriate range, while ensuring the integrity of the membrane structure.

Preferably, in step (3), the treatment time is 12-72 h, and the treatment temperature is 20-50° C.

In another aspect, the present invention also discloses a solvent-resistant polymeric nanofiltration membrane prepared by the above-mentioned method, including a plurality of polyimide polymeric segments, where the polyimide polymeric segments include a first repeating unit and a second repeating unit, and the ratio of polymerization degrees of the first repeating unit and the second repeating unit is 1-100:1-100; and the carboxyl groups in the different polyimide polymeric segments are coordinated and cross-linked with metal ions.

Preferably, in each polyimide polymeric segment, the number of the first repeating unit is 10-1000 and the number of the second repeating unit is 10-1000.

In the present invention, the polyimide polymeric segment includes the following structural formula:

in which m=10-1000; n=10-1000; m:n=1-100:1-100; unless otherwise specified, the meanings of m and n in the following are the same as here; R is derived from a dianhydride, R' is derived from a diamine without a carboxyl group, and R" is derived from a diamine with a carboxyl group; specifically:

R is selected from one of the following structural formulas:

R' is selected from one of the following structural formulas:

R" is selected from one of the following structural formulas:

and

Taking R"

as an example, the structural formula of the polyimide polymeric segment and the structure after coordination with the metal ion are as follows:

Preferably, the solvent-resistant polymeric nanofiltration membrane of the present invention has a molecular weight cut-off of 850 Da and has a flux of 10-50 $Lm^{-2}$ $h^{-1}$ $bar^{-1}$ at an operating pressure of 1 MPa.

In a specific embodiment of the present invention, at an operating pressure of 1 MPa, the solvent-resistant polymeric nanofiltration membrane has a retention rate of up to 99% for Coomassie Brilliant Blue in a methanol solvent, and the membrane flux reaches 30 $Lm^{-2}$ $h^{-1}$ $bar^{-1}$.

The solvent-resistant polymeric nanofiltration membrane of the present invention has good swelling resistance and compaction resistance in polar organic solvents such as methanol, ethanol, acetone, chloroform, N-dimethylformamide, N,N-dimethylacetamide, N-methylpyrrolidone and 1,4-dioxane, as well as high flux.

In still another aspect, the present invention also discloses use of the above-mentioned solvent-resistant polymeric nanofiltration membrane in the separation and/or purification of a compound in an organic solution.

Preferably, a solvent in the organic solution includes one or more of methanol, ethanol, acetone, chloroform, N-dimethylformamide, N,N-dimethylacetamide, N-methylpyrrolidone, and 1,4-dioxane.

Preferably, the compound being separated includes dye molecules, drug molecules and natural biomolecules.

The present invention provides a preparation method that can improve the swelling resistance and physical and chemical stability of a solvent-resistant polymeric nanofiltration membrane without affecting the membrane flux. The present invention prepares a target membrane material through the steps of polyimide carboxylation, phase inversion and ion cross-linking. A diamine monomer with a carboxyl group, a diamine monomer without a carboxyl group and an aromatic acid dianhydride monomer are subjected to a cyclization imidization reaction under selected conditions to form a polyimide material, which includes a polyimide copolymer containing carboxyl groups; after phase inversion, the carboxyl groups in multiple polyimide copolymer chains are immersed in a solution of a divalent or multi-valent metal salt, so that the metal ions are coordinated and cross-linked with the carboxyl groups; and thus, the swelling resistance, physical and chemical stability, organic solvent resistance and mechanical properties of the membrane material are improved, and the problem of reduced membrane flux of the polyimide membrane due to the cross-linking treatment is alleviated.

Compared with the prior art, the present invention has the following advantages and effects:

1. The present invention adopts the strong coordination cross-linking technology of divalent or multi-valent metal ions and carboxyl groups to keep the polyimide backbone structure intact. The obtained membrane material has good physical and chemical stability, and significantly improved mechanical strength (see FIG. 5).
2. Due to the strong coordination cross-linking effect of divalent or multi-valent metal ions and carboxyl groups, the obtained membrane material has good swelling resistance to a variety of organic solvents such as methanol, ethanol, acetone, chloroform, N-dimethylformamide, N,N-dimethylacetamide, N-methylpyrrolidone, 1,4-dioxane.
3. In the prior art, a cross-linking agent is usually used to form a covalent bond with polyimide, and the membrane flux of the obtained membrane material is greatly reduced compared with that before cross-linking. The chemical bond energy of the coordination bond is significantly weaker than the chemical bond energy of the covalent bond. Therefore, the present invention uses a cross-linking agent to form a coordination bond with polyimide, and the membrane flux of the obtained membrane material is not significantly lower than that before cross-linking, and a higher membrane flux can still be maintained.
4. Due to the multi-coordination cross-linking method, the membrane material prepared by the present invention has a stable structure and good compaction resistance, and can maintain a relatively stable membrane flux and a high retention rate over a long test time (see FIG. 7).
5. The preparation process of the solvent-resistant polymeric nanofiltration membrane provided by the present invention is simple and controllable, has good repeatability, is suitable for large-scale industrial production, and has good application prospects in the field of organic solution separation.

The forgoing description is only used for summarizing the technical solution of the present invention, and in order to more clearly understand the technical means of the present invention and implement the present invention according to the content of the description, preferred embodiments of the present invention are described below in detail in conjunction with the drawings.

Figure 1:
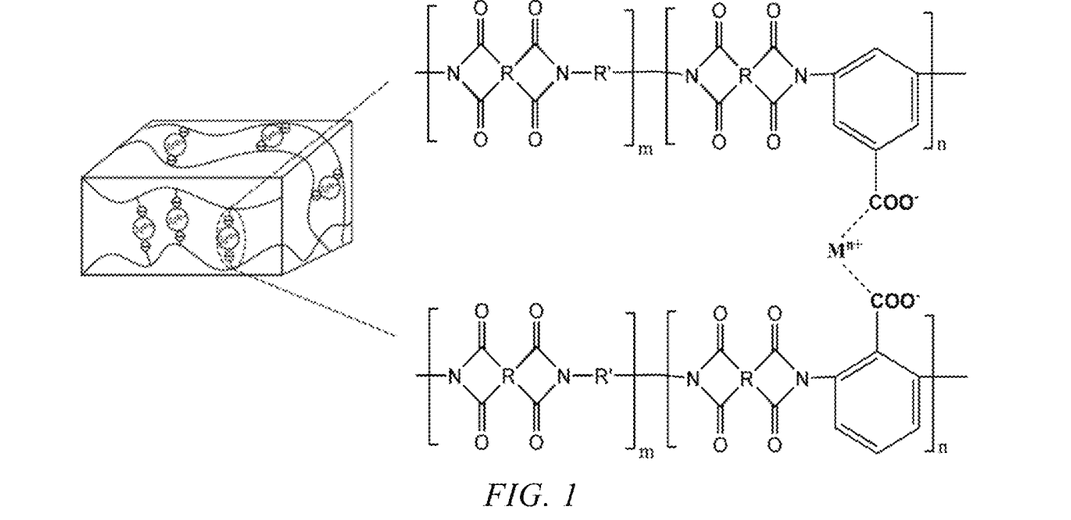
FIG. 1 is a schematic diagram of the ion cross-linking effect of a solvent-resistant polymeric nanofiltration membrane in a specific embodiment of the present invention.

MEANING OF SYMBOLS IN THE DRAWINGS $M^{n+}$ in FIG. 1 represents a divalent or multi-valent metal ion.

DETAILED DESCRIPTION OF THE PREFERRED EMBODIMENTS

A detailed description of the present invention will be further given below in detail with reference to embodiments. The following embodiments are merely used for illustrating the present invention, and not intended to limit the scope of the present invention.

The materials involved in the examples are: DURENE represents 2,3,5,6-tetramethyl-1,4-phenylenediamine; DABA represents 3,5-diaminobenzoic acid; 6FDA represents 4,4'-(hexafluoroisopropylene) diphthalic anhydride; Toluene; Ethanol; DMF represents N,N'-dimethylformamide; Acetone; Methanol; Acetonitrile.

A preferred embodiment is described below, and the present invention is not limited thereto.

EMBODIMENT

DURENE and DABA (a total amount of 1 mol) are added to 300 mL of an m-cresol solution at room temperature, 44.4 g of 6FDA is added in portions, stirring is performed for 24 h until a uniform solution is formed, and then 50 mL of anhydrous toluene is added. The system is gradually heated to 200° C. for 6 h. The temperature is lowered, and the product solution is poured into methanol with constant stirring. The obtained product is vacuum dried at 120° C. for 12 h to obtain a polyimide material.

Figure 2:
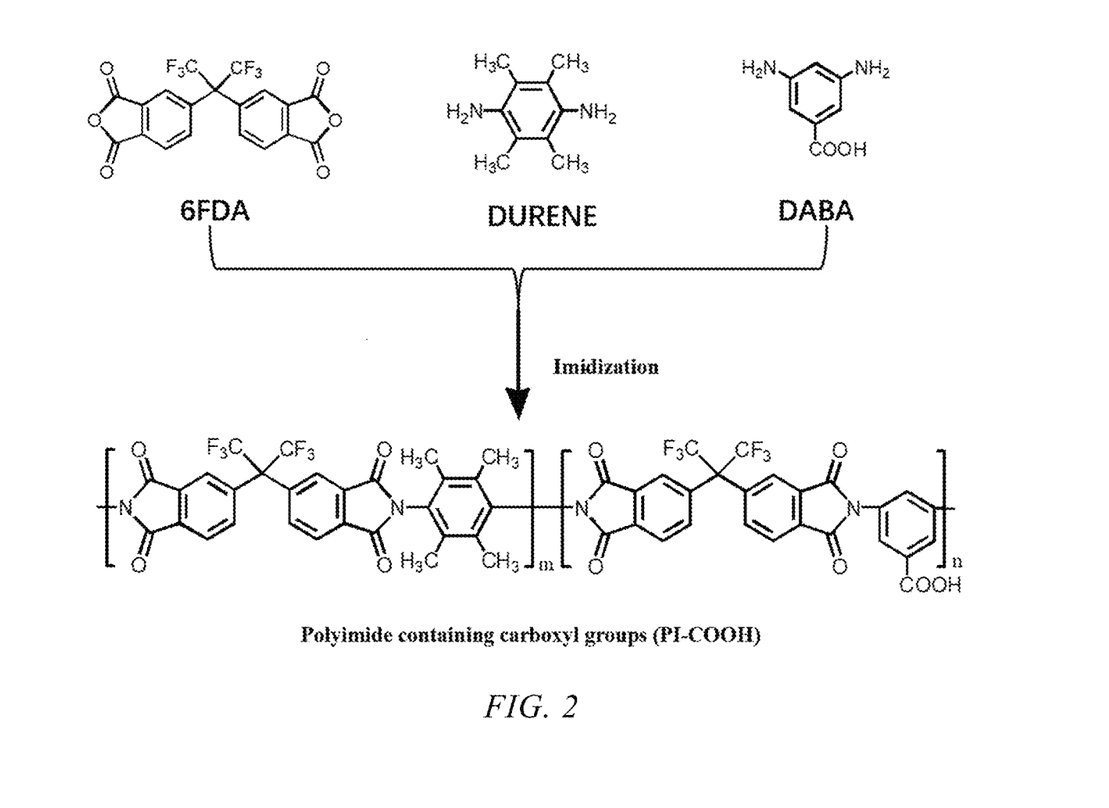
FIG. 2 is a schematic diagram of a synthetic route of a polyimide copolymer containing carboxyl groups in an embodiment of the present invention.
Figure 3:
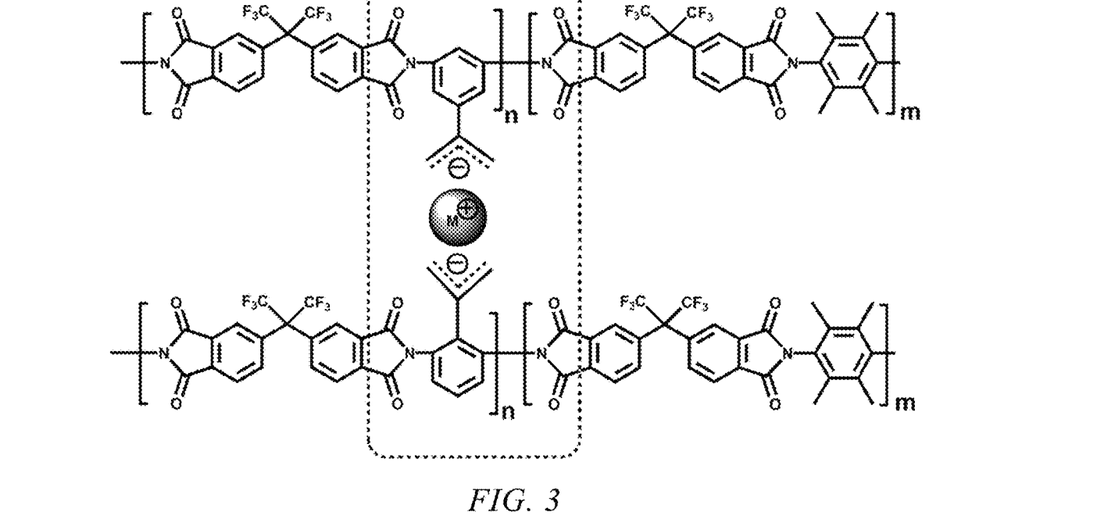
FIG. 3 is a principle diagram of the ion cross-linking effect of a solvent-resistant polymeric nanofiltration membrane in an embodiment of the present invention.

The chemical formula and synthetic route of the polyimide copolymer containing carboxyl groups (PI—COOH) in the formed polyimide material are shown in FIG. 2, where m is an integer greater than or equal to 1, and n is an integer greater than or equal to 1, and n/m=10~1000:1000~10.

The polyimide material is dissolved in a mixed solvent of N,N-dimethylformamide and 1,4-dioxane (10:1 to 1:1), stirred overnight, and left for 24 h to remove bubbles to obtain a 10-40 wt % membrane-forming solution.

Preparation of a flat membrane material: the height of a doctor blade is adjusted to 100-500 μm, the humidity is controlled at 30-40%, the membrane-forming solution is poured on a glass plate for casting; it is allowed to stand in the air for 10-100 s, the glass plate is transferred to a water bath, phase inversion treatment is carried out for 0.5-2 h; a membrane formed after phase inversion treatment is transferred to a fresh water bath for 24 h, the residual solvent is washed off to ensure the completion of phase inversion; the intermediate membrane is stored in methanol.

Preparation of a hollow fiber membrane material: the membrane-forming solution is filtered through a screen, a filtrate is transferred to a membrane-forming solution tank, and the filtrate is degassed at a temperature of 15-50° C.; the degassed filtrate is subjected to spinning treatment through a concentric hole spinneret with a central hole, where a core liquid fluid is extruded through the central hole of the spinneret, and the degassed filtrate is extruded through an annular gap, forming a hollow fiber membrane.

A 0.05-0.5 mol/L methanol solution of copper nitrate is prepared, and the intermediate membrane is immersed in the methanol solution of copper nitrate for cross-linking for 24 h at a temperature of 20-50° C. The formed membrane is removed, washed with methanol, and stored in methanol.

The molecular weight cut-off of the solvent-resistant polymeric nanofiltration membrane is 850 Da; and the membrane flux is 10-50 $Lm^{-2}$ $h^{-1}$ $bar^{-1}$ at an operating pressure of 1 MPa. It can be applied in the fields of separation and purification of dye molecules, drug molecules and natural products, and recovery of organic solvents.

The technical solutions of the present invention will be further explained below in conjunction with several examples.

Example 1

DURENE (0.09 mol, 14.8 g) and DABA (0.01 mol, 1.5 g) were added to 300 mL of an m-cresol solution at room temperature, 44.4 g (0.1 mol) of 6FDA was added in portions, stirring was performed for 24 h until a uniform solution was formed, and then 50 mL of anhydrous toluene and a catalyst quinoline were added to the mixture. The system was gradually heated to 200° C. and held for 6 h. The temperature was lowered, and the product solution was poured into methanol with constant stirring. The obtained product was vacuum dried at 120° C. for 12 h to obtain a polyimide material PI—$COOH_{10}$ with a degree of polymerization (m+n) of above 300 and m:n=9:1.

The polyimide material was dissolved in a mixed solvent of N,N-dimethylformamide and 1,4-dioxane (3:1), stirred overnight, and left for 24 h to remove bubbles to obtain a 22 wt % membrane-forming solution.

Preparation of a flat membrane material: the height of a doctor blade was adjusted to 300 the humidity was controlled at 30-40%, the membrane-forming solution was poured on a glass plate for casting; it was allowed to stand in the air for 10 s, and the glass plate was transferred to a water bath. After 1 h, a membrane formed after phase inversion treatment was transferred to a fresh water bath for 24 h, the residual solvent was washed off to ensure the completion of phase inversion; the intermediate membrane was stored in methanol.

Preparation of a hollow fiber membrane material: the membrane-forming solution was filtered through a screen, a filtrate was transferred to a membrane-forming solution tank, and the filtrate was degassed at a temperature of 35° C.; the degassed filtrate was subjected to spinning treatment through a concentric hole spinneret with a central hole, where a core liquid fluid was extruded through the central hole of the spinneret, and the degassed filtrate was extruded through an annular gap, forming a hollow fiber membrane. During the preparation process, the humidity was controlled at 30-40% and the temperature at 20-25° C.

A 0.1 mol/L methanol solution of copper nitrate was prepared, and the intermediate membrane was immersed in the methanol solution of copper nitrate for cross-linking for 24 h at a temperature of 40° C. The formed membrane was removed, washed with methanol, and stored in methanol.

Example 2

The synthesis method of the polyimide material was the same as in Example 1, except that the amount of DURENE was 0.08 mol (13.1 g) and the amount of DABA was 0.02 mol (3.0 g) to obtain a polyimide material PI—$COOH_{20}$ with a degree of polymerization (m+n) of above 300 and m:n=4:1.

The preparation method of the solvent-resistant polymeric nanofiltration membrane was the same as in Example 1.

Example 3

The synthesis method of the polyimide material was the same as in Example 1, except that the amount of DURENE was 0.07 mol (1.5 g) and the amount of DABA was 0.03 mol (4.6 g) to obtain a polyimide material PI—$COOH_{30}$ with a degree of polymerization (m+n) of above 300 and m:n=7:3.

The preparation method of the solvent-resistant polymeric nanofiltration membrane was the same as in Example 1.

Example 4

The synthesis method of the polyimide material was the same as in Example 1, except that the amount of DURENE was 0.06 mol (9.8 g) and the amount of DABA was 0.04 mol (6.1 g) to obtain a polyimide material PI—$COOH_{40}$ with a degree of polymerization (m+n) of above 300 and m:n=3:2.

The solvent-resistant polymeric nanofiltration membrane was a flat membrane, and the preparation method thereof was the same as in Example 1.

Figure 4:
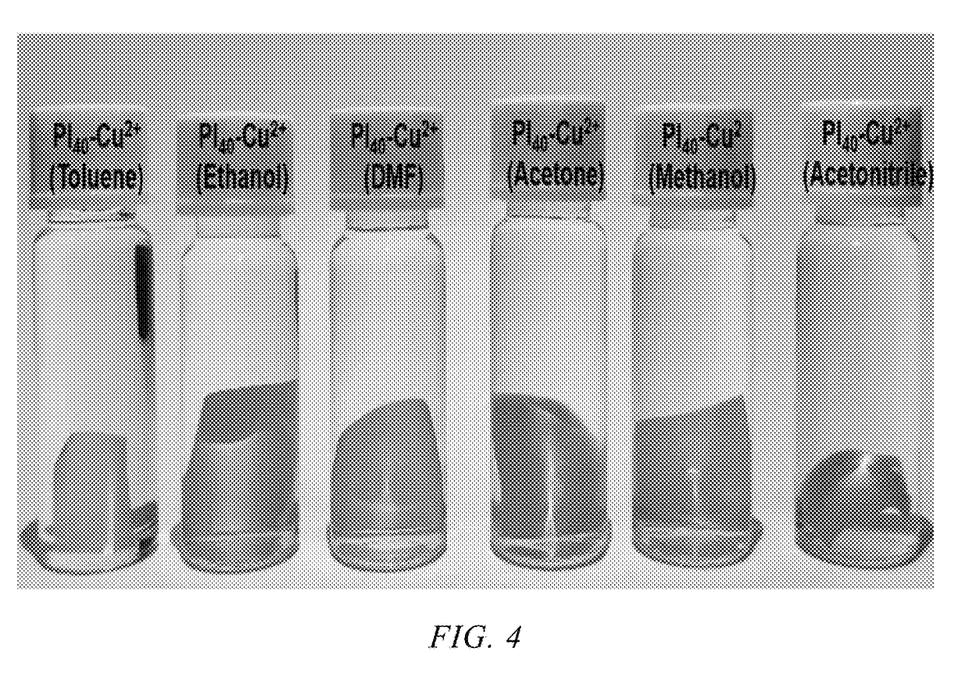
FIG. 4 is a photo showing that a solvent-resistant polymeric nanofiltration membrane in Example 4 of the present invention is stably present in various organic solvents.

The prepared solvent-resistant polymeric nanofiltration membrane is stably present in various organic solvents. As shown in FIG. 4, in various polar organic solvents, the polymeric nanofiltration membrane of the present invention has stable morphology without obvious swelling and morphological changes, indicating that its solvent resistance is better. The organic solvents in FIG. 4 are Toluene, Ethanol, DMF, Acetone, Methanol, and Acetonitrile from left to right.

Figure 5:
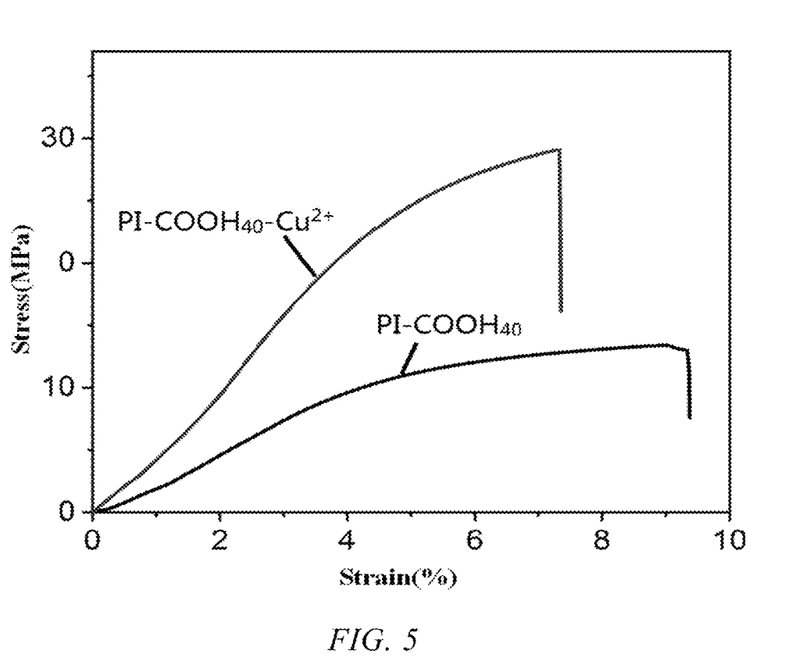
FIG. 5 is a comparison of mechanical strength between a solvent-resistant polymeric nanofiltration membrane in Example 4 of the present invention and an uncross-linked polyimide membrane.

For comparison, a polyimide material PI—$COOH_{40}$ was prepared according to the above-mentioned method of this example, and was finished as a flat membrane, that is, it was not subjected to cross-linking in a methanol solution of copper nitrate. FIG. 5 is the comparison results of tensile strength between the solvent-resistant polymeric nanofiltration membrane (PI—$COOH_{40}$—$Cu^{2+}$) prepared in this example and the polyimide membrane (PI—$COOH_{40}$) not cross-linked in a methanol solution of copper nitrate. It can be seen from the figure that the solvent-resistant polymeric nanofiltration membrane prepared in this example has a higher breaking strength of about 28 MPa and a tensile modulus of 595.04 MPa, and the uncross-linked polyimide membrane has a breaking strength of about 12 MPa, and a tensile modulus of 278.37 MPa.

Figure 6:
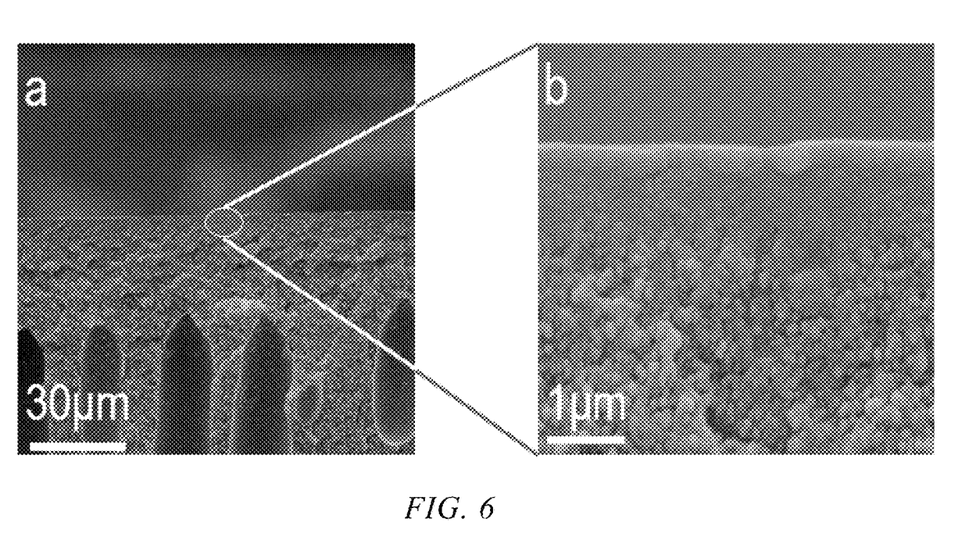
FIG. 6 is a scanning electron micrograph of a cross-section of a solvent-resistant polymeric nanofiltration membrane in Example 4 of the present invention.

FIG. 6 is a scanning electron micrograph of the polymeric nanofiltration membrane prepared in this example. It can be seen from the figure that the surface of the membrane has a complete dense layer structure, a good supporting layer of finger holes is retained inside the membrane, and the overall structure of the membrane is not deformed.

Figure 7:
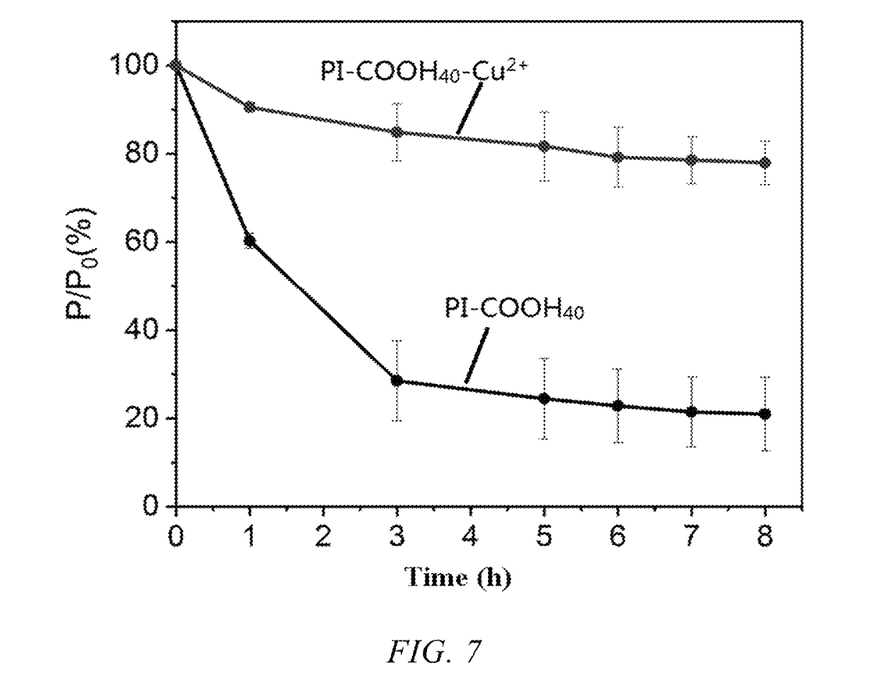
FIG. 7 is a comparison of compaction resistance between a solvent-resistant polymeric nanofiltration membrane in Example 4 of the present invention and an uncross-linked polyimide membrane.

FIG. 7 is the comparison of compaction resistance between the solvent-resistant polymeric nanofiltration membrane (PI—$COOH_{40}$—$Cu^{2+}$) in this example and the polyimide membrane (PI—$COOH_{40}$) not cross-linked in a methanol solution of copper nitrate. It can be seen from the figure that the flux of the uncross-linked membrane decreases sharply with time, while the cross-linked solvent-resistant polymeric nanofiltration membrane maintains a stable flux level, and after 8 h operation, it still maintains above 80% of the original flux, indicating that the membrane has better compaction resistance.

Figure 8:
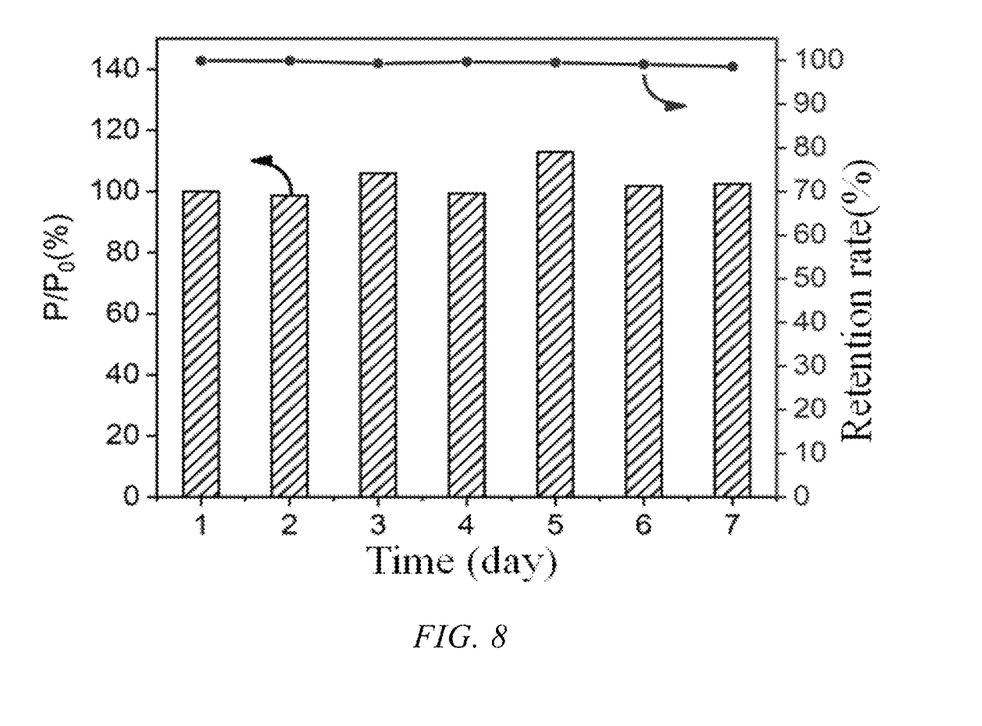
FIG. 8 is a graph showing changes in the flux of a solvent-resistant polymeric nanofiltration membrane in Example 4 of the present invention over time.

FIG. 8 shows the change of the flux of the polymeric nanofiltration membrane prepared in this example over time. It can be seen from the figure that during the continuous operation of up to one week, the membrane flux does not change significantly, and its ratio to the initial flux fluctuates between 99-110%, and the retention rate of the target molecule remains above 99%.

In addition, the nanofiltration membranes of Examples 2-4 were used to separate Coomassie Brilliant Blue in methanol, and the specific steps were as follows:

A methanol solution of Coomassie Brilliant Blue was filtered at 1 MPa, and the results showed that the nanofiltration membranes of Examples 2-4 had a retention rate of 95-99% for Coomassie Brilliant Blue, and the flux was 15-30 $Lm^{-2}$ $h^{-1}$ $bar^{-1}$.

Example 5

The synthesis method of the polyimide material was the same as in Example 1, except that the amount of DURENE was 0.05 mol (8.2 g) and the amount of DABA was 0.05 mol (7.6 g) to obtain a polyimide material PI—$COOH_{50}$ with a degree of polymerization (m+n) of above 300 and m:n=1:1.

The preparation method of the solvent-resistant polymeric nanofiltration membrane was the same as in Example 1.

Example 6

This example serves as a comparative example. The synthesis method of the polyimide material was the same as that of Example 1, except that in this example, only a diamine monomer with a carboxyl group, DABA (15.2 g) was added to obtain a polyimide material PI—$COOH_{100}$.

The preparation method of the solvent-resistant polymeric nanofiltration membrane was the same as in Example 1.

The polymeric nanofiltration membrane prepared in this example was used to filter a methanol solution of Coomassie Brilliant Blue at 1 MPa. The results show that the retention rate of Coomassie Brilliant Blue is 98-99%, and the flux is 2-5 $Lm^{-2}$ $h^{-1}$ $bar^{-1}$.

Example 7

The synthesis method of the polyimide material was exactly the same as in Example 4.

The preparation method of the solvent-resistant polymeric nanofiltration membrane was the same as in Example 1, except that the salt solution used was replaced with 0.1 mol/L copper sulfate.

Example 8

The synthesis method of the polyimide material was exactly the same as in Example 4.

The preparation method of the solvent-resistant polymeric nanofiltration membrane was the same as in Example 1, except that the salt solution used was replaced with 0.1 mol/L lanthanum chloride. The polymeric nanofiltration membrane prepared in this example was used to filter a methanol solution of Coomassie Brilliant Blue at 1 MPa. The results show that the retention rate of Coomassie Brilliant Blue is 95-99%, and the flux is 15-25 $Lm^{-2}$ $h^{-1}$ $bar^{-1}$.

Example 9

The synthesis method of the polyimide material was the same as in Example 1, except that DURENE was replaced with 4,4'-diaminobenzophenone in an amount of 0.06 mol (12.7 g), and the amount of DABA was 0.04 mol (6.1 g), to obtain a polyimide material PI'—$COOH_{40}$ having a structural formula below:

in which m:n=3:2.

The preparation method of the solvent-resistant polymeric nanofiltration membrane was the same as in Example 1.

The polymeric nanofiltration membrane prepared in this example was used to filter a methanol solution of Coomassie Brilliant Blue at 1 MPa. The results show that the retention rate of Coomassie Brilliant Blue is 95-99%, and the flux is 15-20 $Lm^{-2}$ $h^{-1}$ $bar^{-1}$.

Example 10

The synthesis method of the polyimide material was the same as in Example 1, except that DURENE was replaced with 5(6)-amino-1-(4-aminophenyl)-1,3,3-trimethylindan in an amount of 0.06 mol (16.9 g), the amount of DABA was 0.04 mol (6.1 g), and 6FDA was replaced with 3,3',4,4'-benzophenonetetracarboxylic dianhydride in an amount of 32.2 g, to obtain a polyimide material PI"—$COOH_{40}$ having a structural formula below:

in which m:n=3:2.

The preparation method of the solvent-resistant polymeric nanofiltration membrane was the same as in Example 1.

The polymeric nanofiltration membrane prepared in this example was used to filter a methanol solution of Coomassie Brilliant Blue at 1 MPa. The results show that the retention rate of Coomassie Brilliant Blue is 97-99%, and the flux is 15-20 $Lm^{-2}\ h^{-1}\ bar^{-1}$.

Example 11

The synthesis method of the polyimide material was the same as in Example 1, except that DURENE was replaced with 4,4'-diaminodiphenylmethane in an amount of 0.06 mol (11.9 g), and the amount of DABA was 0.04 mol (6.1 g), and 6FDA was replaced with 3,3',4,4'-benzophenone tetracarboxylic dianhydride in an amount of 32.2 g, to obtain a polyimide material PI'''—$COOH_{40}$ having a structural formula below:

in which m:n=3:2.

The preparation method of the solvent-resistant polymeric nanofiltration membrane was the same as in Example 1.

The polymeric nanofiltration membrane prepared in this example was used to filter a methanol solution of Coomassie Brilliant Blue at 1 MPa. The results show that the retention rate of Coomassie Brilliant Blue is 98-99%, and the flux is 10-15 $Lm^{-2}\ h^{-1}\ bar^{-1}$.

The following descriptions will be made regarding other implementations and changes of the present invention:

1. The above examples use DURENE or 4,4'-diaminobenzophenone or 5(6)-amino-1-(4-aminophenyl)-1,3,3-trimethylindan or 4,4'-diaminodiphenylmethane as a common diamine monomer, DABA as a diamine monomer with a carboxyl group, m-cresol as a strong polar solvent with a high boiling point, 6FDA or 3,3',4,4'-benzophenone tetracarboxylic dianhydride as an aromatic acid dianhydride monomer, a mixed solvent of N,N-dimethylformamide and 1,4-dioxane as an organic solvent, water as a component of a phase inversion bath, and copper nitrate, copper sulfate, and lanthanum chloride as metal salts. The present invention is not limited thereto, and various other materials may be combined to prepare different kinds of polyimide materials, and different kinds of metal salts may be used to form different kinds of solvent-resistant polymeric nanofiltration membranes.

2. The reaction temperature and humidity conditions, reaction time, and specific parameters used in the above examples can all be adjusted according to actual needs. This embodiment does not apply limitations upon these details.

The description above merely gives the preferred embodiment of the present invention, and is not intended to limit the present invention. It should be noted that several modifications and variations can be made by those of ordinary skill in the art without departing from the technical principles of the invention, and these modifications and variations should be considered within the scope of the present invention.

What is claimed is:

1. A method for preparing a solvent-resistant polymeric nanofiltration membrane, comprising steps of:
   (1) reacting a diamine monomer with a dianhydride monomer in the presence of a catalyst in a first polar organic solvent at 160-230° C., to form a polyimide; wherein the diamine monomer comprises at least one diamine monomer with a carboxyl group and at least one diamine monomer without a carboxyl group; the structural formula of the polyimide comprises a first repeating unit and a second repeating unit, the first repeating unit comprising at least one polymeric segment of the dianhydride monomer and the diamine monomer with a carboxyl group, the second repeating unit comprising at least one polymeric segment of the dianhydride monomer and the diamine monomer without a carboxyl group; and
   wherein the boiling point of the first polar organic solvent is higher than 160° C.;
   (2) dissolving the polyimide in a second polar organic solvent, to form a membrane-forming solution with a concentration of 10 wt % to 40 wt %; then, performing phase inversion after the membrane-forming solution is formed into a membrane, to obtain an intermediate membrane;

(3) treating the intermediate membrane with an organic solution of a metal salt, so that the metal ion is coordinated and cross-linked with the carboxyl group in the polyimide, to obtain the solvent-resistant polymeric nanofiltration membrane after the cross-linking is completed, wherein the metal salt is selected from divalent and/or multi-valent metal salts.

2. The method according to claim 1, wherein in step (1), the diamine monomer with a carboxyl group is selected from at least one monomer with a structural formula of NH$_2$—R''—NH$_2$, in which R'' in each monomer is selected from the following structural formulas:

3. The method according to claim 1, wherein in step (1), the diamine monomer without a carboxyl group is selected from at least one monomer with a structural formula of NH$_2$—R'—NH$_2$, in which R' in each monomer is selected from the following structural formulas:

4. The method according to claim 1, wherein in step (1), the dianhydride monomer is selected from at least one monomer with a structural formula of in which R in each monomer is selected from the following structural formulas:

-continued

5. The method according to claim 1, wherein in step (1), the molar ratio of the dianhydride monomer, diamine monomer with a carboxyl group and diamine monomer without a carboxyl group is 10:0.1-9.9:0.1-9.9.

6. The method according to claim 1, wherein in step (2), a method of preparing a flat membrane or a method of preparing a hollow fiber membrane is used to form the membrane-forming solution into a membrane.

7. The method according to claim 1, wherein in step (3), the divalent metal salt is selected from the group consisting of a copper salt, a nickel salt, a zinc salt, a cobalt salt, a magnesium salt, a calcium salt and any combination thereof, and the multi-valent metal salt is selected from the group consisting of an iron salt, a lanthanum salt, an aluminum salt and any combination thereof.

8. A solvent-resistant polymeric nanofiltration membrane prepared by the method of claim 1, comprising a plurality of polyimide polymeric segments, wherein the polyimide polymeric segments comprise the first repeating unit and the second repeating unit, and the ratio of polymerization degrees of the first repeating unit and the second repeating unit is 1-100:1-100; and the carboxyl groups in the different polyimide polymeric segments are coordinated and cross-linked with metal ions.

9. The solvent-resistant polymeric nanofiltration membrane according to claim 8, wherein in each polyimide polymeric segment, the number of the first repeating unit is 10-1000 and the number of the second repeating unit is 10-1000.

10. Use of the solvent-resistant polymeric nanofiltration membrane of claim 8 in the separation and/or purification of a compound in an organic solution.

* * * * *